March 3, 1970 L. D. GILL 3,498,521

CARTON WITH PLASTIC SEALING

Filed Dec. 11, 1967 5 Sheets-Sheet 1

INVENTOR
Lester D. Gill

BY Landoe, Neill, Schuttler & Wikstrom

ATTORNEYS.

March 3, 1970 L. D. GILL 3,498,521

CARTON WITH PLASTIC SEALING

Filed Dec. 11, 1967 5 Sheets-Sheet 2

INVENTOR
Lester D. Gill
BY Sandoe, Hill, Schottler & Wilkinson
ATTORNEYS.

March 3, 1970 L. D. GILL 3,498,521

CARTON WITH PLASTIC SEALING

Filed Dec. 11, 1967 5 Sheets-Sheet 3

INVENTOR
Lester D. Gill

BY Sandoe, Neill, Schottler & Wikstrom
ATTORNEYS.

CARTON WITH PLASTIC SEALING

Filed Dec. 11, 1967 5 Sheets-Sheet 4

INVENTOR
Lester D. Gill

BY Sandoe, Hill, Schottler & Wikstrom

ATTORNEYS.

CARTON WITH PLASTIC SEALING

Filed Dec. 11, 1967 5 Sheets-Sheet 5

INVENTOR
Lester D. Gill
BY Lundoe, Neill, Schottler & Wikstrom
ATTORNEYS.

United States Patent Office 3,498,521

Patented Mar. 3, 1970

3,498,521
CARTON WITH PLASTIC SEALING

Lester D. Gill, 302 North Road, Kinnelon, N.J. 07405

Continuation-in-part of application Ser. No. 424,946, Jan. 12, 1965. This application Dec. 11, 1967, Ser. No. 689,669

Int. Cl. B65d *5/08, 5/74*

U.S. Cl. 229—16 4 Claims

ABSTRACT OF THE DISCLOSURE

This specification discloses boxes made of paperboard and lined with plastic which makes the boxes suitable for holding liquid. The lining is correlated with the panels of the box in such a way that there is no cut edge of the paperboard exposed to liquid in the container. This prevents "wicking" of the liquid into the paperboard. Some embodiments of the invention are constructed with the additional feature of panels that unfold to produce a pour spout with the plastic lining; and in one modification there is a tab on the pour spout that can be tucked in under the other panels when folded down to hold the spout closed after a reclosing operation. The box blanks are shaped so that they are held in a continuous web having spaces beyond critical cut edges where the plastic lining extends beyond the cut edges and over the cut out spaces.

This application is a continuation-in-part of my earlier filed patent application Ser. No. 424,946, filed Jan. 12, 1965, now Patent No. 3,357,322, issued Dec. 12, 1967. It is also an improvement on Patent No. 3,114,300, issued to Branchi on Dec. 17, 1963.

SUMMARY OF THE INVENTION

This invention provides an improved box suitable for manufacture from relatively light paperboard ("cardboard") up to approximately .050 inch, and which is liquid-proof and moisture-proof, and can be made gas-proof, if desired. Laminates of various materials such as kraft paper, foil and the different plastic films can be used. These materials can be applied by different methods such as lamination or extrusion on different materials such as paperboard or corrugated paperboard. Exact materials used are controlled by customers specifications to accomplish proper protection for product.

The boxes of this invention can be made as canister-type boxes which can be supplied to packers in a flat and knocked-down condition. Canister boxes of the prior art have required construction at the box factory to a form that has to be shipped and stored with the box in a condition which gives its final volume so that large space is required for both shipping and storing; and with resulting increase in packaging costs.

The boxes of this invention include also pouring cartons with panels that fold outward to provide pour spouts. These cartons have a plastic lining with extensions of the plastic which seal to confronting faces of plastic to provide containers that are liquid-proof and that do not wick at the cut edges of their lap seams or end panels.

The invention provides a lower cost box for liquids, the box having its inner surface coated with a liquid-proof coating and having any uncoated portions of the box material located on panels that are on the outside of the box seam. In the preferred construction, the coating on the box material is applied so as to extend somewhat beyond the edges of certain die-cut panels of the box, and in the assembled box the extending coating along edges of seam-forming panels is bonded to the coating on adjacent areas of the inside surface of the box with no interruption at the seams, and thus to seal raw cut board edges and to prevent liquid contents of the box from wicking through the board centers, and also to prevent escape of gases.

Other objects, features and advantages of the invention will appear or be pointed out as the description proceeds.

DESCRIPTION OF THE DRAWING

In the drawing, forming a part hereof, in which like reference characters indicate corresponding parts in all the views:

FIGURE 1 shows a web 16 which is advanced with intermittent motion toward the right in the drawing by feed rollers 17. Ths web is moved with continuous motion if manufacturing equipment permits. This web 16 is preferably made of paperboard which usually has one side smoother than the other. In the preferred operation of the invention the web is advanced with the smooth side uppermost for receiving the impression of a printer 18 which is moved into and out of contact with the web by actuators 20. A platen 22 is located under the printer 18 at the printing station. This construction is merely representative of printing means; and where the printing is in color, it may be done with a separate cylinder for each color.

Beyond the printing station, the web 16 travels past a cutting, scoring and stripping station, indicated diagrammatically by an upper platen 24 and a lower platen 26. The upper platen 24 has cutting rule and scoring rule which cut box blanks 32 and 34 from the web 16.

Figures 1, 2, 3, 4, 5:
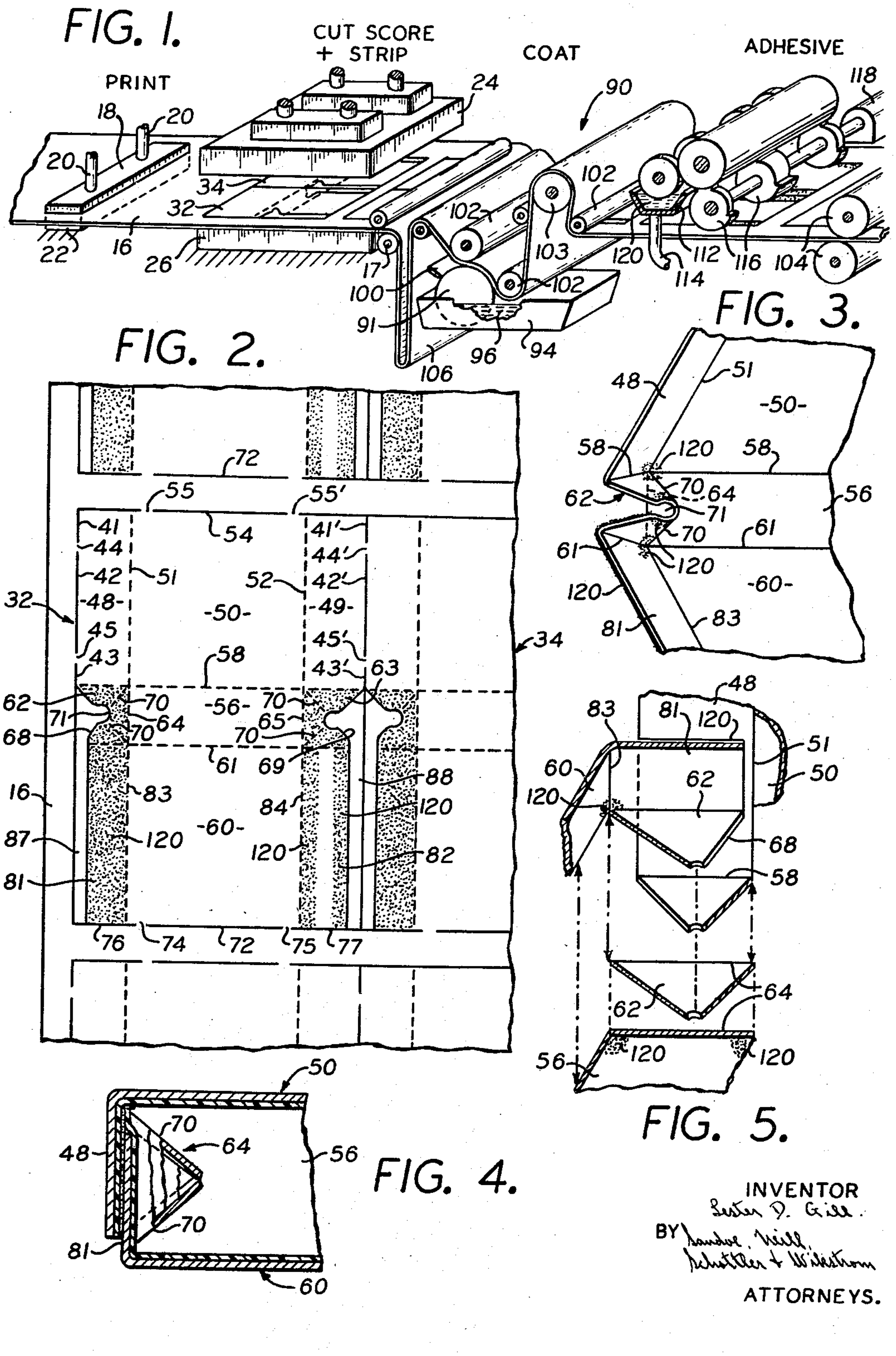
FIGURE 1 is a diagrammatic, isometric view showing steps in the manufacture of box blanks in accordance with this invention.
FIGURE 2 is a greatly enlarged fragmentary view of a portion of the web shown in FIGURE 1.
FIGURE 3 is a fragmentary view illustrating the way in which the panels of a box blank of FIGURE 1 are initially folded when starting to form the box.
FIGURE 4 is a sectional view, partly broken away and illustrating the completion of the fold which is shown in its starting condition in FIGURE 3; the section in FIGURE 4 being taken on the line 4—4 of FIGURE 7.
FIGURE 5 is a diagrammatic exploded view showing more clearly the relation of the folds of FIGURE 4.

One of the blanks 32 is shown in detail in FIGURE 2. The web is slit along lines 41, 42 and 43, which are in alignment but separated from one another by lands or nicks 44 and 45 where the web remains uncut. Similar lines 41′, 42′ and 43′ are slit along the outer side of the box blank and these lines are separated by similar lands or nicks 44′ and 45′.

The lines 41, 42 and 43 and the corresponding lines on the other side of the box blank form the side edges of end or side panels 48 and 49 of the box blank. These end or side panels 48 and 49 connect with a back panel 50 along scored fold lines 51 and 52.

At one end of the back panel 50 there is a slit line 54 extending across the entire width of the box blank from the slit line 41 to the slit line 41′; but with lines or nicks 55 and 55′, if necessary.

The back panel 50 joins a bottom panel 56 along a scored fold line 58; and the bottom panel 56 is joined to a front panel 60 along another scored fold line 61. There are fold-back end panels 62 and 63 connected with the lower ends of the end panels 48 and 49 along extended portions of the scored fold line 58.

In order to facilitate the folding of the blank, the fold back end panels 62 and 63 have cut back edges 68 and 69, respectively, and further to facilitate the folding, there are diagonal scored fold lines 70 extending from a cut back center region 71 at one end of the cut back edges 68 and 69 back to the intersections of the fold lines 51 and 58.

At the score lines 70, the fold-back end panels 62 and 63 join fold-in end panels **62*a* and 63*a*, respectively, which connect with the bottom panel 56 along score lines 64 and 65, respectively. At their forward ends, the fold-in end panels 62*a* and 63*a* are connected at other score lines 70′ to other fold-back end panels 62′ and 63′, respectively. These other fold-back end panels 62′ and 63′ correspond to the panels 62 and 63 and have similar cut back edges 68′ and 69′**, respectively.

The front panel 60 is cut from the web 16 along a slit line 72 which terminates at lines or nicks 74 and 75 where the web is uncut. Other slit lines 76 and 77, in alignment with the slit line 72, extend across the remainder of the box blank. The layout can be changed so that there is no waste between successive blanks and a single slit replaces the slits 54 and 72.

There are end panels 81 and 82 connected with the front panel 60 along scored fold lines 83 and 84, respectively, and these end panels 81 and 82 join the fold-back end panels 62′ and 63′, respectively, along extensions of the scored fold line 61.

The side edges of the panels 81 and 82 are sepaarted from the remainder of the web by cut-out areas 87 and 88, respectively, and these cut-out areas 87 and 88 extend along the side edges of the fold-back end panels 62′ and 63′, respectively. The material of the web is stripped from the web to leave the areas 87 and 88 open after the web passes beyond the cutting, scoring and stripping station formed by the platens 24 and 26 of FIGURE 1. The actual apparatus for stripping the waste from the areas 87 and 88 is omitted from FIGURE 1 for clearer illustration, since such apparatus for stripping waste material from webs is well understood in the art and its illustration is not necessary for a complete understanding of this invention.

Referring again to FIGURE 2, it will be apparent from the foregoing description that the side edges of the box blank from the line 58 to the lower end of the blank (lines 72, 76 and 77) are entirely free of any connections to the web and are spaced from the other material of the web. This lower portion of the box blank remains in place in the web, and advances as a unit with the web as a result of the connection formed by the lands or nicks 74 and 75. For some constructions and configurations these nicks 74 and 75 are unnecessary and the side nicks 44, 45, 44′ and 45′ are sufficient.

Referring again to FIGURE 1, the web 16 continues its travel to a coating station 90 including rotogravure coating roller 91 which applies a coating 96 of plastic to the bottom of the web 16. The roller 91 receives plastic from a container 94 into which the roller 91 dips. The amount of plastic on the roller 91, and the resulting thickness of the film of plastic applied to the web, can be controlled by adjusting a doctor blade 100. The web 16 passes over guide rolls 102 and a chill roll 103. The drive of the web 16 through the coating station 90 is by means of feed rolls 104 which operate continuously. There is a loop 106 in the web between the intermittently moving part of the web ahead of the feed rolls 17 and the continuously moving part of the web travels through the coating station 90 by the pull of the feed rolls 104.

This coating apparatus is merely representative of any printing process or any coating process which can be substituted for that shown. For more economical construction of the box, the coating is applied only to the undersurface of the web 16. Where the boxes which are made from the box blanks require outside protection, the coating is applied also to the upper surface of the web. A curtain coater may be used. The term "coating" is used herein in a generic sense to include application of any sheet, film, or foil of any material required for proper portection of product using any coating method in addition to that illustrated.

Beyond the coating station, the web 16 passes an adhesive-applying station to be used when carton style or specifications require an adhesive. This station includes an adhesive container 112 which is maintained in a heated condition by burners 114. This adhesive container 112 is used for hot-melt adhesive which is applied to limited areas of the top surfaces of the web 16 by applicator rollers 116. These rollers 116 are driven through a gear box 118 so as to make one revolution for each box blank; and the rollers 116 are shaped so that they have high arcs which touch only that portion of each box blank to which adhesive is to be applied. When only one side of the web is coated, the rollers 116 apply hot-melt adhesive 120 to the uncoated outside side of the web.

The areas of each box blank to which the rollers 116 apply adhesive are the bottom end panels 62; 63; 62*a*; 63*a*; 62′ and 63′ (FIGURE 2) and the front end panels 81 of and 82. Optionally, adhesive may be applied to the back end panels. These rollers 116 may be shaped to apply the adhesive 120 across the full width of the panels, as shown on the panel 81, or with the adhesive 120 in parallel zones, as shown on the panel 82. In any event, however, the adhesive 120 extends to the side edge of the panels so that in the sealing of the box, some adhesive can be squeezed out beyond the edges of the panels 62, 63, 81 and 82, for purposes which will be described.

Beyond the adhesive-applying station, the box blanks are severed from the web and folded to form boxes. If the boxes are not to be completed, but are to be shipped in knocked-down condition to a packaging plant, then the box blanks may be stripped from the web without applying the adhesive 120, or the adhesive can be applied and permitted to cool for reactivation at the packaging plant where the box blanks are to be folded into set-up boxes and filled, but if desired, adhesive other than hot-melt adhesives can be used.

In applying the coating 96 (FIGURE 1) to the web 16, the coating is applied across the full width of the box blanks and across the web beyond the box blanks so that a film of coating extends beyond the edges of the blanks, and particularly beyond the edges of the panels from which waste material is removed to form the cut-out areas 87 and 88. In the preferred operation of the invention, the coating spans the cut-out areas 87 and 88, and when the box blanks are stripped from the web, this coating is severed substantially midway between the box blanks and some distance out from the edges of the box blanks that are near the side edges of the web, so that at least a part of the extending portion of the coating, which spanned these areas 87 and 88, remains attached to each side box blank.

FIGURE 3 shows the way in which the box blank is folded. The back panel 50 and front panel 60 are folded upward along the fold lines 58 and 61, respectively, while the end panels 48 and 81 are folded inward along the fold lines 51 and 83, respectively. This causes the fold-in end panel 62*a* to fold along the line 64 and at the same time the folded end panels 62 and 62′ fold along the diagonal fold lines 70 and along the extended portions of the fold lines 58 and 61, respectively.

In the construction shown in FIGURE 3, there is some adhesive 120 on the inside of the box blank around the cut back center region 71 and at the regions where the diagonal lines 70 and 70′ meet the score lines 58 and 61, respectively.

FIGURES 4 and 5 show the panels 50 and 60 folded up into positions parallel to one another and at right angles to the bottom panel 56. They also show the folds where the end panel 48 and 81 overlap one another and the connections of the panels 64, 64*a* and 64′ fold along the diagonal fold lines 70 so as to form three superimposed thicknesses overlying the bottom panel 56. The adhesive 120 on the bottom of panel 62*a* bonds it to the bottom panel 56.

Figures 6, 7, 8, 9, 9A, 10:
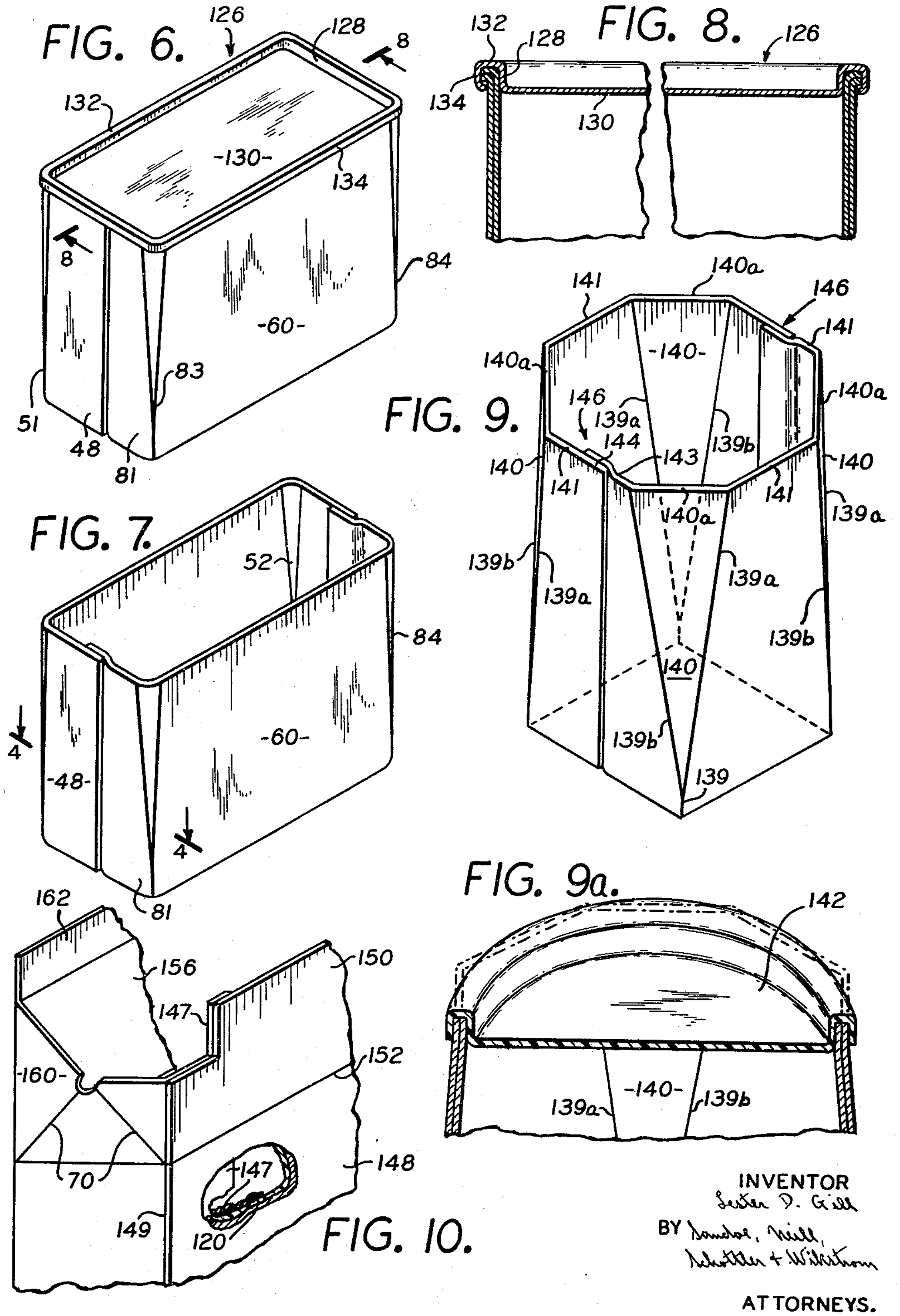
FIGURE 6 is an isometric view showing the top of the box of FIGURE 4 in a completed condition.
FIGURE 7 is a view similar to FIGURE 6 but showing the box with the cover removed.
FIGURE 8 is an enlarged fragmentary view taken on the line 8—8 of FIGURE 6.
FIGURE 9 is a fragmentary view, similar to FIGURE 7, but showing a modified construction of the invention.
FIGURE 9*a* is a fragmentary sectional view showing the way in which a plastic top is applied to the upper end of the box shown in FIGURE 9.
FIGURE 10 is an isometric view showing another modified form of the invention.

FIGURE 6 shows the box after it had been formed into set-up condition and has had a top 126 applied to the upper edges of all of the panels. FIGURE 7 shows a box in set-up form and before the cover 126 is applied. FIGURE 8 shows the cover 126 with an upwardly extending portion 128 at right angles to a depressed top area 130. An extending edge 132 at the upper end of the portion 128 contacts with the top edge of the box and the cover is secured to the box by turning the top edge portion 132 downward to form a rim 134 which clinches the upper part of the side walls of the box to secure the cover of the box. This type of cover with the rolled edge forming a gripping rim 134 is well known in the art and it is not necessary to illustrate apparatus for attaching this top in order to fully understand the present invention.

Although the attaching of a plastic top, molded paper top, or rolled metal top such as the top 126, requires a substantial downward pressure on the box, the box of this invention can withstand such pressure because of the double thickness of the side walls along the lap seam, as is well illustrated in FIGURE 7. While there is a break in the contour of the side surfaces where the side panels terminate, this does not present a problem in the use of a rolled metal top because the thickness of the material in proportion to the size of the box is exaggerated in FIGURE 7 and in all the figures of the drawing for clearer illustration and to permit the showing of the sections and in addition to the thickness actually being less than that indicated in the drawing, there is sufficient resilience in the material of which the box is made to permit the rim 134 (FIGURE 8) to be imbedded into the paperboard so that there is no place where the top 126 does not contact with both sides of the walls of the box and thus prevent leakage.

FIGURE 9 shows a construction similar to that described in connection with the other figures except that the panels are joined together at Y score lines 138 having branches 139*a* and 139*b* which take the place of the fold lines 52 of FIGURE 7 and which leave triangular intermediate panels 140 (FIGURE 9). This construction permits the box to have an octagonal top and a rectangular bottom for folding, as already described. The intermediate panels 140 can be made as deep as desired and can extend all the way to the bottom of the box. By making top edges 140*a* of the panels 140 equal to the length of the other top edges 141 and arcing these edges, the top of the box can be circular. This construction gives the upper end of the box a shape having corners which are not as sharp as those of FIGURE 7. These corners shown in FIGURE 9 make is easier to construct a cover for the box and the auxiliary panels 140 at each of the corners can yield to accommodate a cover which is rounded at the corners instead of square, as shown in FIGURE 6; or a circular top with arcs on each of the top edges of the side panels. FIGURE 9*a* shows a round plastic top 142 applied to the upper end of the container shown in FIGURE 9, the section being through a seam of the container where the wall is of double thickness. Metal tops, such as aluminum and tin, can be used; also molded paper tops. In the construction illustrated in FIGURE 9, there are two score lines 143 and 144 with the scores on opposite sides of the board and spaced from one another by a distance substantially equal to the thickness of the board, so as to give the side wall an offset that keeps the outside walls on both sides of the seam 146 flush with one another.

Where material permits and specifications require it, the Y scores need extend only part way toward the top or can be eliminated to facilitate forming a perfect circle or round top.

FIGURE 10 shows a modified construction in which the box blank is coated on its inside surface with a portion of the coating 96 extending beyond the edge of an inside panel 147 which is lapped by an outside panel 148 to form a seam 149. Adhesive 120 that bonds the panels 147 and 148 together extends beyond the edge of the inner panel 147 and secures the plastic coating on the inside surface of the panel 148, at a location adjacent to the edge of the panel 147, to the coating 96 that extends beyond the raw cut edge of panel 147, as already described. Adhesive squeezed from between the panels 147 and 148 when the seam is formed, adds to the seal securing the plastic coatings together. This box can be sealed by the "hammer and anvil" method.

The box of FIGURE 10 has a panel 150 connected with the panel 148 along a scored fold line 152 and has a back panel 156 secured to the back panel of the box along a similar scored fold line. The back panel 156 is long enough to cover the top of the box when folded down over the panel 150 after being secured to that panel by adhesive. There are a fold-in end panel 160a and fold-back end panels 160 and 160′ secured to adjacent panels of the box blank on three sides and these panels fold along fold lines 70 in a manner similar to that already described in connection with the other views.

A panel 162 connected to the edge of the back panel 156 folds down over the upper part of the front panel 148 and provides a pull tab for opening the box. The box shown in FIGURE 10 is preferably closed in the same way at both top and bottom.

Figures 11, 12, 13, 14, 15, 16, 16A, 17:
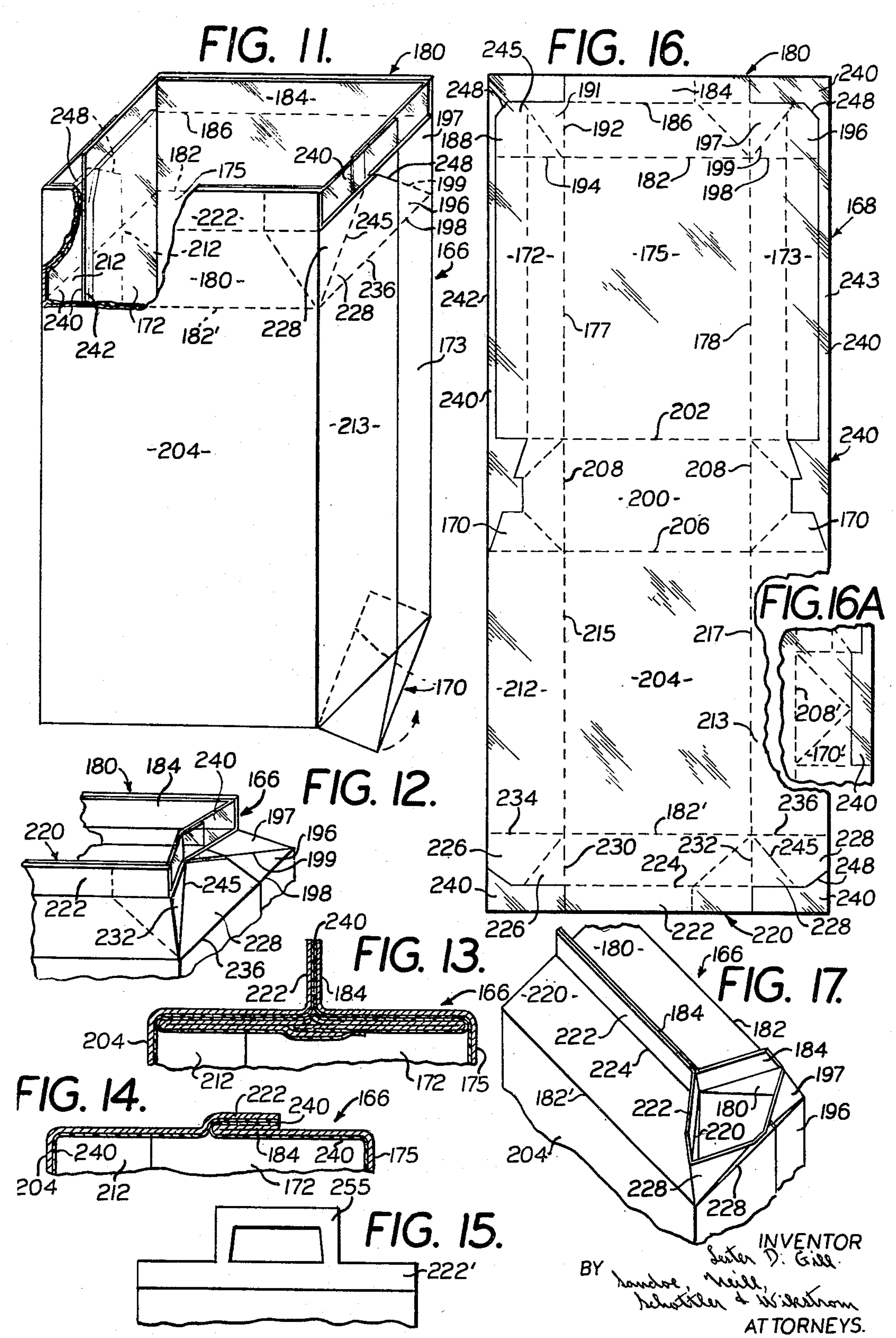
FIGURE 11 is an isometric view showing the invention applied to a pour spout type of box.
FIGURE 12 is a fragmentary view of a part of the upper portion of the box shown in FIGURE 11 with the panels partly folded as the box is closed.
FIGURE 13 is a sectional view through the box shown in FIGURES 11 and 12 after the box has been closed and sealed.
FIGURE 14 shows the panels of the sealing ridge of FIGURE 13 folded over against the top of the box to facilitate stacking, this section being taken near the center of the box beyond the fold-in end panels.
FIGURE 15 is a side elevation showing a modified form of the box illustrated in FIGURES 11–14.
FIGURE 16 is a plan view, on a reduced scale, showing the blank from which the box of FIGURES 11–14 is made.
FIGURE 16*a* is a modification of FIGURE 16.
FIGURE 17 is an isometric view; on a reduced scale, of the box shown in FIGURES 11–14 with the box sealed and the pour spout open.

FIGURE 11 shows a box 166 which is made from the box blank 168 shown in FIGURE 16. The bottom of this box is of the same type as shown in FIGURES 2–5 except that the folded bottom end or side panels 170 (FIGURE 11) are preferably located outside of the box, and either folded in under or on top of the bottom or folded up along the side of the box 166, preferably outside, as shown in broken lines.

The box blank 168 shown in FIGURE 16 has side or end panels 172 and 173. These end panels connect with a back panel 175 along scored fold lines 177 and 178. At the upper end of the back panel 175 there is a top closure panel 180 connected to the back panel 175 along a score line 182. The upper part of the top closure panel 180 has a sealing ridge panel 184 which joins the lower part of the top closure panel 180 along a score line 186.

There is a fold-in end panel 188 joined to the end panel 172 along a score line 190 and joined to a fold-back end panel 191 along a score line 192. At the other end of the top closure panel 180 there is another fold-in end panel 196 joined to the end panel 73 and to a fold-back end panel 196 along score lines 198 and 199, respectively.

There are other score lines at the top, the purpose of which will be explained in connection with the pour spout, The back panel 175 joins a bottom panel 200 along a score line 202; and the bottom panel 200 is joined to a front panel 204 along a score line 206.

There are fold-in and fold-back end panel groups, designated generally by the reference character 170, joined to the bottom panel 200 along score lines 208 and joined to the end panels of the front and back of the box in the same way as already described in connection with FIGURE 2 and no detailed description of the bottom construction is necessary since the differences from FIGURE 2 are essentially only differences in shape.

There are end panels 212 and 213 connected to the front panel 204 along score lines 215 and 217, respectively, and there is a top closure panel 220 corresponding to the top closure panel 180 of the back panel and having a sealing ridge panel 222 at its upper end connected with the remainder of the closure panel 220 along a score line 224. There are fold-back end panels 226 and 228 connected with opposite ends of the closure panel 220 along fold lines 230 and 232, respectively. There are fold-back end panels 226a and 228a connected with the end panels 212 and 213 along score lines 234 and 236, respectively.

The end panels 172 and 173 are somewhat narrower than the end panels 212 and 213; but a plastic coating or lining 240, which extends across the entire area of the blank 168, is the same width at the back of the blank as at the front and this plastic lining 240 extends, therefore, beyond the edges of the end panels 172 and 173 to form extending plastic panels 242 and 243. In FIGURES 11, the plastic covers the entire blank 168 and the plastic is indicated by surface shading which is used mostly on those parts of the plastic that extend beyond the edges of the blank.

When the blank 168 is formed into the box 166 (FIGURE 11), the side or end panels 212 and 213 overlap the outside of the side panels 172 and 173, respectively, to form lap seams for the sides of the box. The extending plastic side panels 242 and 243 are sealed to the lining 240, on the panels 212 and 213, respectively, which confront them beyond the edges of the side panels 172 and 173 and this sealing of the confronting lining or coating faces to one another protects the raw cut edges of the end or side panels 172 and 173 from contact with liquid within the box or container.

The fold-in end panels 196 and 228a have diagonal score lines 199 and 245, respectively, which extend from the ends of the score lines 198 and 236, respectively. There are diagonal cuts 248 on the fold-in end panels in register with the score lines 199 and 245 of the adjacent fold-in end panels so as to reduce the thickness of board at the score lines 199 and 245; but the plastic lining 240 extends beyond the diagonal cuts 248 and all the way to the level of the top edges of the closure panels 180 and 220, these closure panels being higher than the fold-in end panels by the height of the sealing ridge panels 184 and 222.

The top of the box 166 is closed by folding the top closure panels 180 and 220 toward one another along their score lines 182 and 182′ while folding the fold-in end panels inward along their score lines 190, 198, 234 and 236.

FIGURE 12 shows one end of the box partly closed. The lower portions of the top closure panels 180 and 220 are converging toward one another as they extend upwardly, but the sealing ridge panels 184 and 222 are maintained in substantially parallel relation to one another, and the plastic 240, which extends above the upper ends of the fold-back end panels 197 and 228, is held substantially upright by these sealing ridge panels 184 and 222. The fold-in end panels 196 and 228a are shown folded along their score lines 198 and 236, respectively, and the fold-back panels 197 and 228 are folded along score lines 199 and 245 and at their junctures with the top closure.

FIGURE 13 shows the upper end of the box 166 closed. The confronting faces of the plastic lining 240 on the sealing ridge panels 184 and 222 are bonded together to close the top of the container across its entire width. The upstanding portions of the plastic 240, which projects above the upper edges of the fold-back panels 197 and 232, is clamped between the faces of the sealing ridge panels 184 and 222 for the full extent of this uptsanding plastic 240 so that there can be no leakage over the top edges of the panels which are folded in and back. This construction provides a seal with only two layers of board and one that is easier to open than boxes having four layers and with folded panels that have to meet at the center of the top. Two layers permit faster sealing. FIGURE 14 shows the sealing ridge panels 184 and 222 folded down against the top of the box to facilitate stacking.

FIGURE 15 shows a modified construction in which a sealing ridge panel 222′ is formed with an upward extension which provides a handle 255. This handle 255 is preferably of one-piece construction with the rest of the box blank. For small and relatively light boxes it is sufficient to have the handle 255 extend upward from only one of the sealing ridge panels, but for heavier boxes both of the sealing ridge panels, corresponding to the panels 184 and 222 of FIGURES 11–14, are made with handle extensions 255. For convenience, the handle 255 should be limited in height so that when the sealing ridge panels are folded over as shown in FIGURE 14, the folded-over handle will not reach beyond the side of the box since doing so would interfere with packing of the boxes side by side and removal of the boxes from a shipping container.

FIGURE 17 shows the way in which the box of FIGURES 11–14 is opened to form a pour spout. The sealing ridge panels 184 and 222 are separated from one another by breaking the seal between their confronting faces. As these sealing ridge panels 184 and 222 are pulled apart from their front ends, as shown in FIGURE 17, the corresponding portions of the top closure panels 180 and 220 are pulled up and outward and this pushes the fold-back panels 197 and 228 outward and pulls the fold-in end panels 196 and 228a upward to provide a pour spout.

Figures 18, 19, 20, 21, 22, 23, 24:
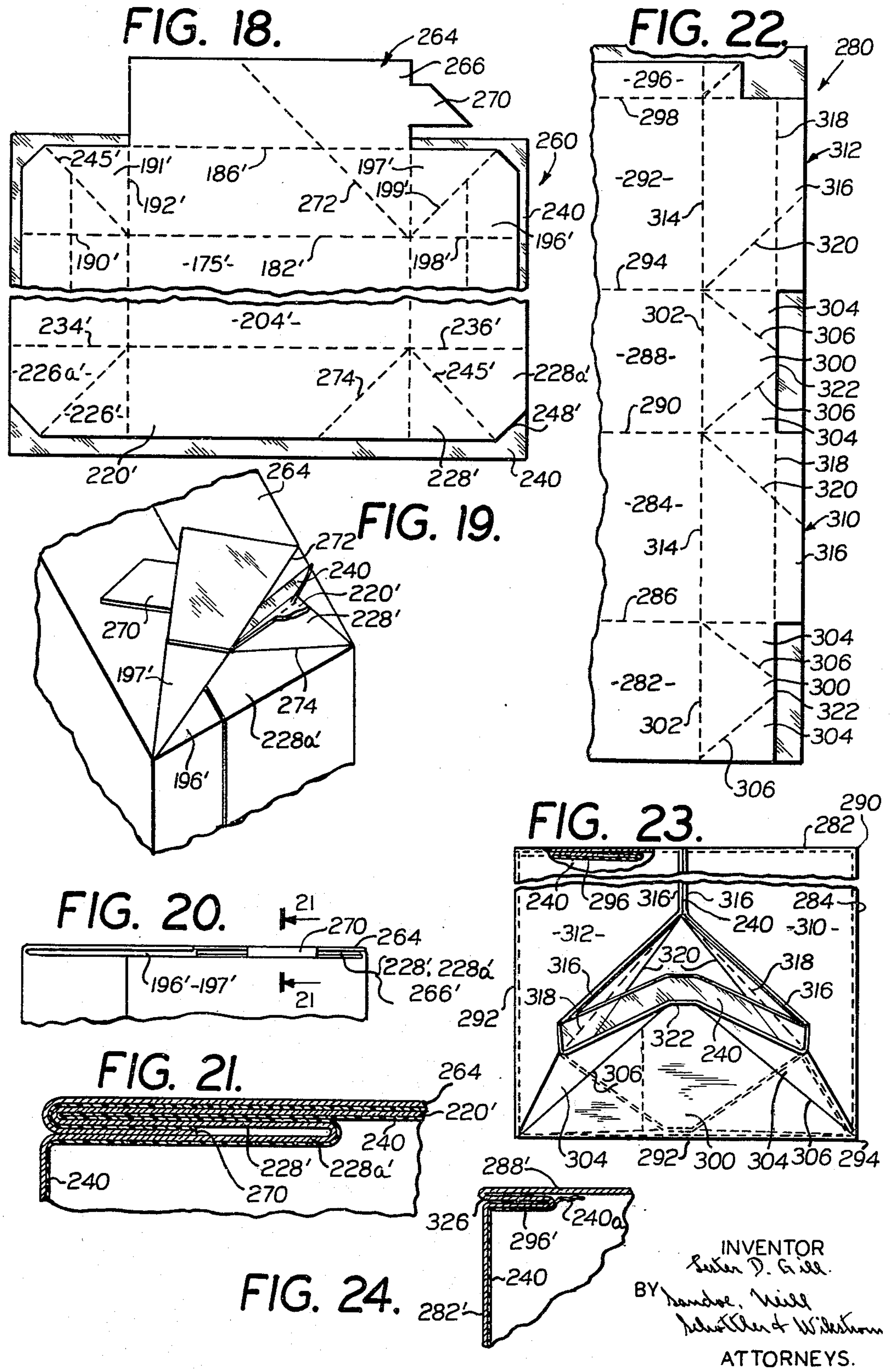
FIGURE 18 is a fragmentary plan view of a modification of the blank shown in FIGURE 16.
FIGURE 19 is an isometric view showing the upper part of a box made from the blank shown in FIGURE 18, the box being shown partly open in order to illustrate the relation of the panels.
FIGURE 20 is a fragmentary end view, on an enlarged scale, of the box shown in FIGURE 19 with the locking tab tucked in after reclosing of the box.
FIGURE 21 is a sectional view, on an enlarged scale, taken on the line 21—21 of FIGURE 20.
FIGURE 22 is a fragmentary view of a portion of another box blank for making boxes embodying this invention but with a single lap seam instead of the construction shown in the other views, with seams at both sides of the box.
FIGURE 23 is a top plan view, on an enlarged scale, of a box made from the blank shown in FIGURE 22 and with the pour spout partially open.
FIGURE 24 is a detail sectional view showing a modified corner construction for the container shown in FIGURE 23.

FIGURE 18 shows a box blank 260 which differs from the box blank of FIGURE 16 in that a top closure panel 264 extends much further up from a score line 182' which corresponds to the score line 182 of FIGURE 16. All parts of FIGURE 18 which correspond to parts of FIGURE 16 are indicated by the same reference characters with a prime appended. This top closure panel 264 has an upper part 266 which takes the place of the ridge panel 184 of FIGURE 16 and which is joined to the lower part of the top closure panel along a score line 186'. There is a tab 270 extending beyond one end of the top closure panel 264.

FIGURE 16a shows a modification of the bottom sealing areas shown in FIGURE 16. Corresponding parts in FIGURE 16a are indicated by the same reference characters as in FIGURE 16 with a prime appended. When using paper stock heavier than that for which the blanks of FIGURE 16 are intended, the combination of panels and score lines shown in FIGURE 16a is advantageous. This difference in shape and score line location permits the packaging machinery to operate more rapidly and decreases the risk of jamming if score lines are imperfect.

FIGURE 19 shows the way in which the top of the box is closed when using the blank shown in FIGURE 18. The portion of the plastic 240 which extends beyond a top closure panel 220' and beyond the upper ends of the fold-back end panel 228' and the fold-in end panel 228a' folds back over the top edges of these panels 220', 228' and 228a', to confront the plastic lining which covers the inside or bottom surface of the top closure panel 264. This seals the box across its entire width when the end panels are folded in and the top closure panels are folded down. The top closure panel 264 extends all the way to the edge of the box FIGURE 19 and this provides a smoother top surface than the construction shown in FIGURE 14.

In order to facilitate the opening of the box, a score line 272 extends transversely across the full width of the top closure panel 264 so that the panel 264 can be bent back at the pour spout side of the box, as shown in FIGURE 19. The other side of the pour spout is opened by bending up a portion of the panel 220' along a score line 274 and the end panels open in essentially the same way as already described in connection with FIGURE 17.

It is a feature of the construction shown in FIGURES 18–21 that the pour spout can be reclosed and the tab 270 tucked in under a fold-back panel 228' to hold the pour spout closed. Thus the tab 270 provides a "lock" for holding the pour spout closed after it has been initially opened and then reclosed by folding the parts back to their original positions. This covers pouring spout and is a sanitary precaution preventing foreign objects from attaching themselves.

One of the advantages of the constructions thus far described, with lap seams at both ends of the box or container located at intermediate locations between corners of the box, and preferably midway between the corners, is that the seams at both ends increase the stacking strength of the boxes. The locating of the seam intermediate the corners greatly increases the strength against bursting when a box filled with liquid is dropped. Also, since seam is not at a corner, there are no laps to be separated where pressure is greatest. Especially, if dropped on a corner.

The folded panel bottom closure, with the folded panels extending upward along the sides ends of the box distributes the strain when a box of liquid is dropped, and distributes force across the sides of the box and to seams located intermediate the corners of the box.

Because of the greater strength of the construction it can be made with lower board caliper if the added strength is not desired. This effects an economy in manufacture. Other economies can be obtained with this invention having flat top sealed containers of high stacking strength. For example wire or wooden cases can be eliminated; and bundling with plastic film can be substituted. This saves the cost of returning cases.

If the carton is originally sealed, the tab 270 can be left free. This simplifies the original sealing and makes the tab 270 available to assist in initially tearing the top closure panel 264 loose from the underlying closure panel 220.

FIGURE 22 shows a box blank 280 which differs from the other blanks in that it forms a container having a single lap seam and a bottom construction which can be similar to the top but without score lines for forming a pour spout.

The blank 280 has a side panel 282 for one end wall of the container, a back panel 284 connected to the side panel 282 at a score line 286. The blank has a panel 288 for the opposite end of the box from the panel 282, and this other side panel 288 is joined to the back panel 284 along a score line 290. A front panel 292 is joined to the side panel 288 by a score line 294; and there is a sealing flap 296 connected to the other side of the front panel 292 along a score line 298.

The plastic lining 240 extends beyond the edge of the sealing lap 296 and when the sealing lap 296 is attached to the panel 282 as shown in FIGURE 23, the lining 240 can be folded back under the cut edge of the sealing lap 296 or it can extend beyond the sealing lap, but in any event this coating is bonded to the confronting face of the coating on the panel 282 to which the sealing lap is attached. If the sealing lap 296 is to go on the outside of the container, the coating is extended beyond the edge of panel 282.

Fold-in panels 300 are joined to the upper ends of the side panels 282 and 288 along score lines 302 across the full width of the side panels 282 and 288. The fold-in end panels 300 have fold-back panels 304 connected to their opposite sides along score lines 306. Top closure panels 310 and 312 are connected with the upper ends of the back and front panels 284 and 292, respectively, along hinge lines 314. Each of the top closure panels 310 and 312 has a sealing ridge panel 316 connected with the lower part of the top closure panel by a score line 318. Score lines 320 in the top closure panels 310 and 312 facilitate opening of the pour spout as shown in FIGURE 23.

The top of the container made from the blank 280 of FIGURE 22 is closed in a manner similar to that already described in connection with FIGURE 11, and the upwardly projecting panels of plastic 240 above the top edges of the panels 300 and 304 are sealed between the plastic covered faces of the sealing ridge panels 316.

A feature of the construction shown in FIGURES 22 and 23 is that the score lines 306 along each of the fold-in end panels 300 converge toward the top of the panels 300 but do not meet. There is a straight edge 322 in the space between the upper ends of the score lines 306 and this construction causes the upper parts of the plastic 240, above the top edges of the panels 300 and 304, to stand up straight so that they are caught between the confronting faces of the sealing ridge panels 316 as the latter come together during the closing of the top of the container.

Another feature of the construction shown in FIGURES 22 and 23 is that the score lines 320 make a different angle with the top edge of the blank 280 than do the score lines 306. The difference in angle is such that the score lines 320, between the score lines 314 and 318, are substantially longer than the score lines 306. This difference in length causes the pour spout to burst open more easily when the sealing ridge panels 316 are pulled apart as shown in FIGURE 23.

It will be understood that the pour spout is shown only part way open in FIGURE 23 and that when fully open the panels 300 and 304 spring out into the positions indicated by broken lines in FIGURE 23.

FIGURE 24 shows a corner having a double fold seam that adds additional strength to that obtained with the single folded seam shown in FIGURE 23. In addition to the glue lap 296′, corresponding to the glue lap 296 of FIGURE 22, there is another glue lap 326 at the opposite side of the box blank. Corresponding parts in FIGURE 24 are indicated by the same reference character as those in FIGURE 23, but with a prime appended. An extension 240*a* of the plastic 240 projects across and beyond the edge of the glue lap 326 and is sealed against the plastic lining on the panel 288′ to protect the cut edge of glue lap 296′ from contact with liquid or other contents of the container. This double sealing lap can also be sealed on the outside of the package.

Figures 25, 26, 27:
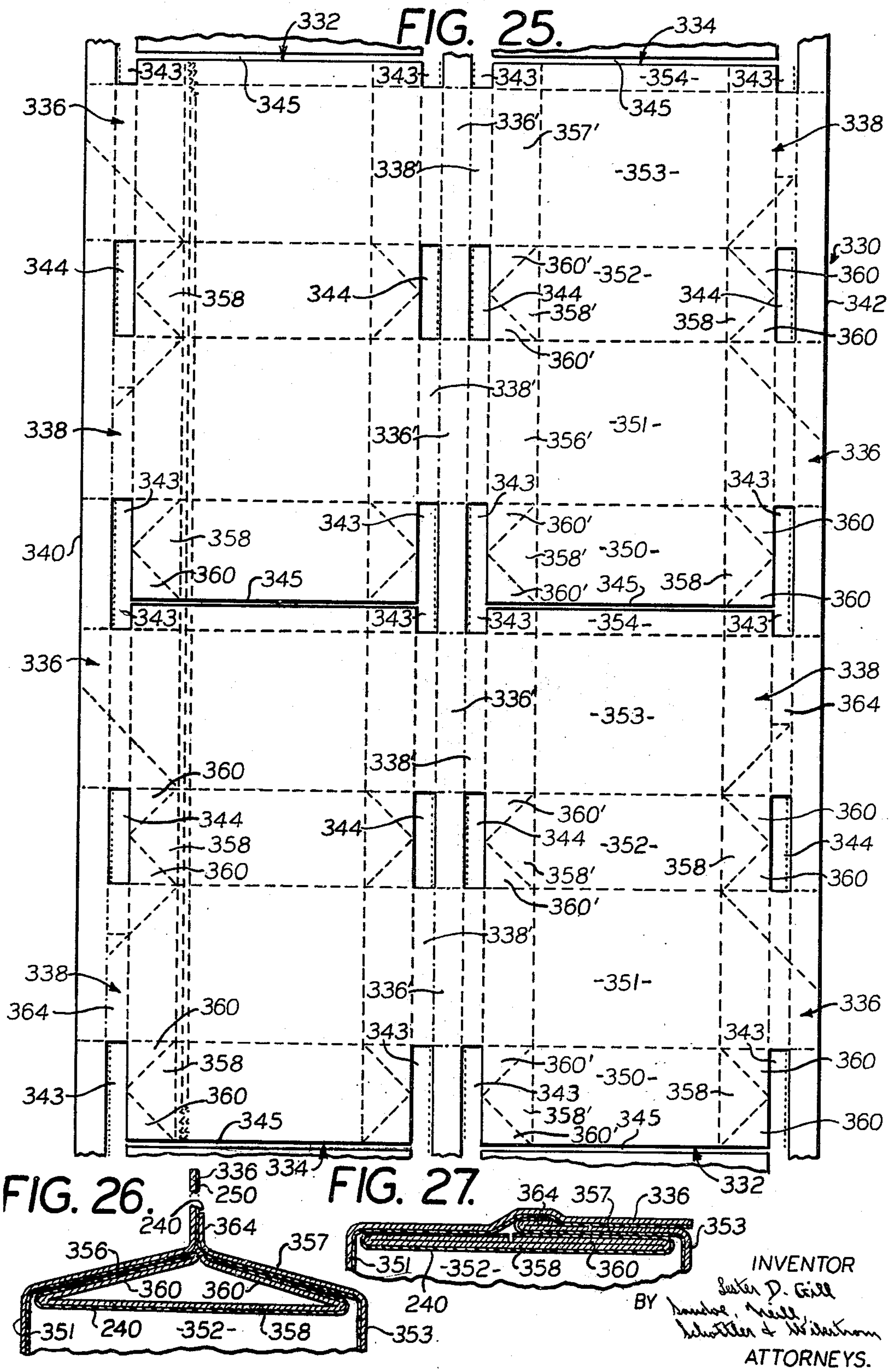
FIGURE 25 is a plan view of a web having box blanks delineated therein and cut-outs and score lines for producing boxes in accordance with this invention.
FIGURE 26 is a sectional view showing the way in which the top panels are brought together when closing a box made from one of the box blanks from the web shown in FIGURE 25.
FIGURE 27 is a sectional view, corresponding to FIGURE 26, but showing the top panels in fully closed position.

FIGURE 25 shows a sheet or web 330 which will vary to conform with customers specifications and manufacturing machinery or equipment. The sheet contains four box blanks two of which are designated by the reference character 332 and two of which are designated by the reference character 334. These boxes are similar except that the laps are at different ends. The correlation of blanks in FIGURE 25 makes it possible to locate the blanks in the web so that the higher or longer of the top closure panels of one blank register with the lower or shorter top closure panels of the other blank to reduce waste and to make possible the use of a narrower web.

The blanks 332 and 334 of FIGURE 25 are similar to the blank 280 of FIGURE 22 except that each blank 332 and 334 has one top closure panel 336 and one bottom closure panel 336′ which is higher than the other top closure panel 338 and bottom closure panel 338′ of the same blank. It will be evident from FIGURE 24 that the blanks are arranged in the web to bring panels 336′ and 338′ of transversely adjacent blanks opposite to one another. The edges of the sheet or web 330 are designated by the reference characters 340 and 342. Before the plastic is applied to the material of the web, the web is die cut to remove the material from all of the areas 343, 344 and 345 indicated by solid rectangular outlines in FIGURE 25. The dash lines are score lines.

These cut-out areas 343, 344 and 345 leave continuation portions along both sides of the web and along the midsection of the web so that the web can continue to run as such after the cutting operation which removes the material from these areas 343, 344 and 345. The plastic 240 or other coating material is then applied to the web 330. The plastic may be applied as a thin sheet of the same width as the web, and it covers the entire area of the web including the cutout areas 343, 344 and 345.

With the sheet or web 330, and with any of the box blanks previously described, the plastic 240 can be extruded over the web, if desired, in any way that will cover the entire area including the cut-out areas. The plastic 240 can be a coat or laminate or it can be a separate film that is sealed to the web at enough places to cause it to stay in place on the web and on the box blanks that are cut from the web.

For the box blanks shown in FIGURE 25, and for any of the box blanks disclosed in this application, the plastic lining can be bonded to the blank near all edges of the blank but left unbonded or only lightly bonded to the large areas such as the front, back and side panels of a container. In the case of containers that are seal closed, such an arrangement has the advantage that a vacuum can be drawn on the contents of the container when it is sealed, and the plastic can move inward away from the vertical panels, as a result of the vacuum, without tending to collapse the sides of the container, or give them concave surfaces.

The package is stronger when the area of coating material bonded to the paperboard is larger. When areas of the coating material are left unbonded to accommodate vacuum sealing, the extent of these areas is determined by the density and other physical properties of the product. For example, a hygroscopic granular material may need accommodation for more volume change under vacuum than a liquid, but the strength of the package for the lighter material need not be as great.

After the plastic 240 has been applied to the web, the box blanks are cut apart, the plastic and paperboard both being cut along the dot and dash lines and the plastic only being cut along the dotted lines where the paperboard had already been cut away before the plastic was applied to the board.

Each blank includes a side panel 350, a front panel 351, an opposite side panel 352, a back panel 353 and a sealing lap panel 354. There are top closure panels 336 and 338, fold-in end panels 358 and fold-back panels 360 connected with the top closure panels. At the bottom of the back, there are bottom closure panels 336′ and 338′ fold-in end panels 358′ and fold-back panels 360′.

Some of the blanks 332 and 334 can be incised to produce tear strips 363 around each of the containers just below the top of the containers. For a container used for granular material this gives a choice of opening a pour spout or tearing off the entire top of the container if it is to be emptied out at one time. If the tear strip extends around only three sides of the container, then the fourth side serves as a hinge connection of the top to the rest of the containers. The incisions for the tear strips are made before the coating is applied to the web. The coating covers the incisions so that they do not interfere with the complete sealing of the contents of the closed container. Since the coating is bonded to the tear strip 363 and is of thin gauge, it tears with the strip when the container is being opened by tearing. The tear strip 363 can be used on containers that have sealed tops without provision for a pour spout.

FIGURES 26 and 27 show the way in which one of the blanks of FIGURE 25 is closed at the top. A sealing ridge panel 364, which is the upper part of the shorter top closure panel 338, has its plastic lining 240 sealed to the plastic on the confronting face of the longer top closure panel 336 as the top panels are folded as shown in FIGURE 26. This sealing of the container is similar to that of the other containers already described, and when the panels are fully folded, the extending part of the longer panel 336 is pushed down flat on top of the shorter top closure panel 338 as shown in FIGURE 27.

The preferred embodiment of the invention has been illustrated and described, but changes and modifications can be made and some features can be used in different combinations without departing from the invention.

What is claimed is:

1. A box for use as a merchandising container formed from a blank of paperboard and having a cover, a bottom and sides that join the bottom along score lines, two of the sides having seams at which areas of the side overlap one another by substantially equal amounts throughout the full height of each seam, and each of said seams extending upward from the bottom for the full height of each seamed side of the box from the bottom to the cover, the bottom being of rectangular shape, and the adjacent sides meeting along score lines corresponding to the corners at the bottom of the box, each of the score lines from the bottom corners dividing into two score lines that diverge from one another as they extend upwardly to the top ends of the side walls to form generally triangular side panels alternating with the other sides that meet the bottom along the perimeter of the rectangle of the bottom whereby the top edge of the box has eight sides, all of the eight sides of the top edge being of substantially the same length, and a cover having a substantially circular peripheral channel opening downward and into which the top edges of all of the side walls and panels extend and by which the upper ends of all of the side walls and panels are held in a bent condition to provide a substantially circular top edge of the box.

2. A merchandising container box having a lower portion formed from a blank of paperboard and having a bottom and sides that join along score lines, two of the sides being connected to form a lap seam of substantially uniform overlap throughout its length, said seam extending upward from the bottom for the full height of said side, the bottom being of polygonal shape, and the adjacent sides meeting at their lower ends along score lines corresponding to angles of the polygonal bottom of the box, each of the score lines from the bottom corners dividing into two score lines that diverge from one another as they extend upwardly to the top ends of the side walls to form generally triangular side panels alternating with the other sides that meet the bottom along the perimeter of the polygon of the bottom whereby the top edge of the box has twice as many sides between score lines as has the polygon bottom, the sides of the box, as they extend upward from the bottom, changing in shape and forming top edges, a cover having a downwardly extending recess in its top surface with side walls of the recess having an outside diameter that causes the cover to fit snugly into the upper end of the box with a force fit into the space surrounded by the upper edges of the side walls and by which the upper ends of all of the side walls and panels are held in a bent condition to provide a substantially circular top edge of the box, and a radially extending rim around the cover at the top of the recess in position to extend across the top edge of the side of the box to limit the extent to which the cover can be pushed down into the box.

3. The box described in claim 2 characterized by the side wall on one side of the seam having scoring of a width equal to at least the thickness of the side walls for bending in opposite directions to produce an offset at the seam that leaves the outside surfaces of the side wall on both sides of the seam flush with one another.

4. The box described in claim 2 characterized by the blank having plastic coating on the side that forms the inside of the box, said coating extending beyond an edge of the blank at that part of the blank which is on the inside of the lap seam by which sides of the box are connected together, said plastic extending beyond the edge for the length of the lap seam from the bottom to the top of the box and beyond the edge of the blank at corners of the bottom.

References Cited

UNITED STATES PATENTS

| | | | |
|---|---|---|---|
| 2,168,186 | 8/1939 | Adamson | 229—21 |
| 2,201,416 | 5/1940 | Wagner | 229—40 X |
| 2,305,365 | 12/1942 | Wentz | 229—16 |
| 2,323,287 | 7/1943 | Amberg | 229—21 X |
| 2,693,307 | 11/1954 | Goodwin | 229—5.5 |
| 2,815,164 | 12/1957 | Painter | 229—16 |
| 2,959,336 | 11/1960 | Mosse et al. | 229—48 X |
| 3,067,079 | 12/1962 | Chinn | 229—48 X |
| 3,217,964 | 11/1965 | Stegner | 229—5.5 |
| 3,269,640 | 8/1966 | Arneson | 229—21 |
| 1,365,250 | 1/1921 | Labombarde | 229—24 |
| 1,910,178 | 5/1933 | Novick | 229—21 |
| 3,122,298 | 2/1964 | Seger | 229—41 X |

DAVIS T. MOORHEAD, Primary Examiner

U.S. Cl. X.R.

229—5.5, 21, 48